(12) United States Patent
Rook

(10) Patent No.: US 9,834,120 B2
(45) Date of Patent: Dec. 5, 2017

(54) AUTOMATIC TABLE DEPLOYMENT

(71) Applicant: David Alan Rook, Cheshire (GB)

(72) Inventor: David Alan Rook, Cheshire (GB)

(73) Assignee: BENTLEY MOTORS LIMITED, Cheshire (GB)

( * ) Notice: Subject to any disclaimer, the term of this patent is extended or adjusted under 35 U.S.C. 154(b) by 129 days.

(21) Appl. No.: 14/784,658

(22) PCT Filed: Apr. 15, 2014

(86) PCT No.: PCT/GB2014/051173
§ 371 (c)(1),
(2) Date: Oct. 15, 2015

(87) PCT Pub. No.: WO2014/170658
PCT Pub. Date: Oct. 23, 2014

(65) Prior Publication Data
US 2016/0059759 A1    Mar. 3, 2016

(30) Foreign Application Priority Data
Apr. 17, 2013  (GB) .................................. 1306946.3

(51) Int. Cl.
*A47B 5/04*    (2006.01)
*B60N 3/00*    (2006.01)
*B60N 2/02*    (2006.01)
*B60R 11/00*   (2006.01)

(52) U.S. Cl.
CPC .............. *B60N 3/004* (2013.01); *A47B 5/04* (2013.01); *B60N 2/0228* (2013.01); *B60R 2011/0015* (2013.01); *B60R 2011/0082* (2013.01); *B60R 2011/0092* (2013.01)

(58) Field of Classification Search
CPC .................................. B60N 3/004; A47B 5/04
USPC .... 297/173, 146, 161, 163–170; 108/42, 48, 108/44
See application file for complete search history.

(56) References Cited

U.S. PATENT DOCUMENTS

| | | | | |
|---|---|---|---|---|
| 4,629,846 A | * | 12/1986 | Dilyard | H05B 6/6411 108/142 |
| 5,259,326 A | * | 11/1993 | Borgman | A47B 9/00 108/147 |
| 5,669,314 A | * | 9/1997 | Grant | A47B 5/00 108/20 |

(Continued)

FOREIGN PATENT DOCUMENTS

| | | |
|---|---|---|
| DE | 32 23 528 | 2/1983 |
| DE | 37 23 027 | 9/1988 |

(Continued)

OTHER PUBLICATIONS

Electric Height Adjustable Desk/Office Furniture Scene http://www.officefurniturescene.co.uk/electric-rectangular-height-adjustable-desk (3 pgs).

*Primary Examiner* — Syed A Islam
(74) *Attorney, Agent, or Firm* — Salter & Michaelson

(57) ABSTRACT

The invention provides an electrically driven stowable and deployable table mounted on a support structure, wherein the table comprises a switch mechanism operable by a user to select between a first, automatic, operation for stowing and deployment of the table, and a second, user adjustable operation for user adjustment of the deployed position of the table.

17 Claims, 3 Drawing Sheets

(56) References Cited

U.S. PATENT DOCUMENTS

| | | | |
|---|---|---|---|
| 7,699,390 B2 | 4/2010 | Baumann | |
| 2005/0040681 A1* | 2/2005 | Goldman | B60N 2/22 297/145 |
| 2006/0214479 A1 | 9/2006 | Dwire et al. | |
| 2009/0058152 A1 | 3/2009 | Orlo et al. | |

FOREIGN PATENT DOCUMENTS

| | | |
|---|---|---|
| DE | 92 04 556.1 | 6/1992 |
| DE | 41 21 660 | 1/1993 |
| FR | 2 802 070 | 6/2001 |

* cited by examiner

AUTOMATIC TABLE DEPLOYMENT

TECHNICAL

The present invention relates to improvements in and relating to automatic table deployment mechanisms, and more specifically to electrically driven stowable and deployable tables mounted on support structures. The invention further relates to seats on which electrically driven stowable and deployable tables are mounted.

BACKGROUND TO THE INVENTION

It is known to provide tables which can be stowed and deployed in vehicles, and which are generally located on a seat of the vehicle, in front of a prospective user. Such seats can be found in many different types of vehicle, such as automobiles, trains and aircraft, where a stowable and deployable seat is mounted in the rear of a seat in front of the user. In the stowed position the table is aligned flush with the back of the seat, or located in a recess in the back of the seat, so as not to protrude into the leg or lap space of a user, and to give maximum room for the occupant sitting behind the table. When a user desires to utilise the table, the table can be rotated such that it is in a deployed position, lying in a generally horizontal position above the user's legs and lap, and can then be stowed again when not in use, by rotating the table back to the stowed position. There are two generally known mechanisms for enabling rotation of such tables, a simple mechanical rotation, which requires manipulation by a user, and automatic, electrically driven rotation, which requires no manipulation of the table itself by a user. In mechanically driven systems, a user must manipulate an edge of the table, and pull the table towards himself or herself in order to rotate the table from the stowed position to the deployed position, and vice versa back to the stowed position. Manipulation of the table edge can be quite difficult for certain users, and mechanically rotatable tables tend to suffer from the fact that it is very difficult to adjust the position of the table. Many mechanically rotatable tables have only two positions, the stowed position and a specified deployed position, whereas others may include a ratchet mechanism which allows one of a limited number of deployed positions. Such mechanisms do not allow optimal adjustment of the position of the table by a user for different seat positions and user seating positions.

In the case of electrically driven rotation systems, the user does not generally have to manipulate the table in order to rotate the table between the stowed and deployed positions, and merely has to press a button or switch in order to do so. This alleviates some of the problems faced by users who find manipulation of a table edge difficult, but does not alleviate the problem of the table having only a single or limited number of deployment positions. Many electrically driven stowing and deployment systems also suffer from a number of problems inherent to electrical drive systems, such as unacceptable noise created by the gearing mechanism powered by the electric drive. The gearing mechanism also tends to create unacceptable visual anomalies, such as juddering or vibration of the table as the gear rotates and effects movement of the table between positions. Finally, known systems of mechanical or electrically driven rotatable tables tend to suffer from poor performance under abuse loading of the table, if an excessive load in placed on the table, or if a user inadvertently bears down on the table.

Embodiments of the present invention have been made in consideration of these problems, with a view to mitigating or alleviating them.

SUMMARY OF THE INVENTION

According to a first aspect of the invention there is provided a stowable and deployable table mounted on a support structure, comprising an electric drive for enabling movement of the table between a stowed position and a deployed position, wherein the electric drive comprises a rack and pinion gear mechanism.

The rack and pinion gear mechanism may comprise a pinion gear meshed with two parallel racks located on opposite edges of the pinion gear, the racks may be flexible, may comprise cables or belts having integral teeth, or the cables may be covered in a cable sheath which comprises suitable teeth for meshing with the pinion gear teeth. The cables may be flexible cables.

The support structure may comprise a primary pivot mechanism connected to the table, about which the table is pivoted between the stowed and deployed position. The support structure may include a secondary pivot mechanism arranged in use to limit movement of the table to a specific end deployment position. The table may comprise a rear edge and a front edge, the rear edge being connected to the primary pivot of the support structure. The secondary pivot of the support structure may comprise an arm connected to a region of the table between the rear and front edges of the table. The arm functions to enable the table to rotate about the primary pivot to a specific end deployment position, past which the table may not be rotated.

The rack or racks may be connected to the primary pivot mechanism or secondary pivot mechanism in some embodiments.

The support structure may comprise a frame to which the table is mounted. The frame may include opposite and parallel side rails, each side rail being connected to a rack via rack trucks slidably located in the rails. Movement of the rack trucks through the rails effects movement of the table up or down the support frame dependent on the rotational direction of the pinion gear. The location of the racks parallel and opposite on the pinion gear ensures that as the gear rotates, the racks move in opposite directions away from the gear, but in the same direction towards the support frame, thereby moving the rack trucks in the same direction on the rails.

The support frame preferably comprises upper and lower movement stops, arranged to prevent movement of the trucks beyond specific positions in the frame. The upper and lower movement stops may correspond to the table deployment end position and stowed position respectfully.

The electric drive may be connected to an operational switch located in the seat or table, which can be operated to start and stop the electric drive. Alternatively the operational switch may be present on a remote control means.

In one embodiment the support structure comprises a primary pivot connected to cable trucks and a secondary pivot arm, the cable trucks being slidably mounted in the support frame, and operation of the electric drive effects movement of the cable trucks along the rails, thereby moving the table along the rails. The secondary pivot arm is arranged to effect rotation of the table about the primary pivot as the trucks move along the support frames.

According to a second aspect of the invention there is provided a seat on which is mounted a support structure and table of the first aspect of the invention.

According to a third aspect of the invention there is provided a vehicle comprising a seat of the second aspect of the invention.

The use of a rack and pinion gear mechanism in which two parallel but oppositely moving racks or cables are used to provide movement of a table, enables an aligned, robust and stable drive system to be utilised, avoiding poor control and alignment of final deployment positions (both deployed and stowed positions) and in which unacceptable noise or visual anomalies during table movement are mitigated or prevented.

The use of parallel drive cables on opposite sides of a support frame, to which primary pivots on a table are attached, also regulates pressure on the pivots, enabling a smooth movement of the table, with minimum stress on the pivot points.

According to a fourth aspect of the invention is provided an electrically driven stowable and deployable table mounted on a support structure, wherein the table comprises a switch mechanism operable by a user to select between a first automatic operation for stowing and deployment of the table, and a second, user adjustable operation for user adjustment of the deployed position of the table.

By "stowable" we mean that the table is generally storable for future use, and not generally usable in the stowed position and "deployable" means the table is movable to a deployed position which enables use of the table.

In some embodiments the switch may have a deployment memory position in which activation of the switch activates the first automatic operation to effect movement between the stowed position and a last used deployment position, and an adjustment mode position which activates the second user adjustable operation so that a user may adjust the deployment position of the seat.

The adjustment mode position may include two separate functions, one which enables a user to adjust the deployment position of the table in one direction, and another in the opposite direction. The deployment memory position may further include two functions, one which is activated to deploy the table in the last used deployment position, and the other used to move the table to the stowed position. The switch may have a neutral position. The switch may be urged into the neutral position in the absence of user manipulation of the switch, or be the default position in absence of user manipulation of the switch. The switch may be any suitable button, lever, knob or the like. The switch may comprise a stowing position, detent corresponding to the adjustment mode position, and a deployment memory position. The detent may have two functions, a first function in which the detent position effects movement of the table towards the table stowing position, and a second function in which the detent effects movement of the table towards the table deployment position, depending on the last known deployment memory position. The stowing position and deployed position of the switch may be effected by opposite actions of the switch, for example pulling or pushing a lever, and the first or second functions of the detent may correspond to the relevant action of the switch, e.g. pushing or pulling. In some embodiments the switch may comprise a stowing position, a stowing detent, a neutral position, a deployment detent and a deployed memory position. The switch may be in the neutral position until a user manipulates the switch, and may be urged back to the neutral position in absence of user manipulation of the switch.

In use, a user may move the switch from the stowing position, though the detent position and to the deployment memory position in order to deploy the table. The switch may then be moved to the detent position in order for a user to adjust the required deployment position of the table. If necessary a user may move the switch to the detent stowing position in order to move the table towards the stowing position. Finally, a user may move the switch to the stowing position in order to effect movement of the table to its stowed position.

The second, user adjustable operation may enable rotation of the table up to 15° or up to 25°.

The first, automatic operation may enable rotation of the table up to 100° or up to 90°.

In some embodiments the table is arranged to deploy to a default final deployment position on first use, and to be subsequently adjusted by an operation using the second, user-adjustable operation, to a user-defined position, and subsequent deployment of the table using the first, automatic operation deploys the table to the user-defined position.

The switch may be part of any suitable electronic apparatus configured to store data relating to the stowed position and deployment position of a table, and the deployment memory position of the switch.

According to a fifth aspect of the invention there is provided a seat on which is mounted an electrically driven stowable and deployable table and support structure of the fourth aspect of the invention.

The support structure may be mounted on or in the back of the seat.

The support structure and table may be as described for the first, second or third aspects of the invention.

The seat may be as described for second aspect of the invention.

The seat may be mounted in a vehicle.

The switch may be located in the back of the seat, preferably adjacent to the table. Alternatively the switch may be located external of the seat, for example in an arm rest, remote control or on the table itself.

The seat may comprise a backrest comprising a front face and a rear face and the support structure and table are mounted on the rear face. The support structure may be located within the rear face, such that it does not substantially protrude from the rear face. The rear face may include a recess in which the table is located in the stowed position. The seat may be a vehicle seat such as an automobile, train or aircraft seat.

DETAILED DESCRIPTION OF THE INVENTION

In order that the invention may be clearly understood, embodiments thereof will now be described, by way of example only, with reference to the accompanying drawings of which:

Figure 1:
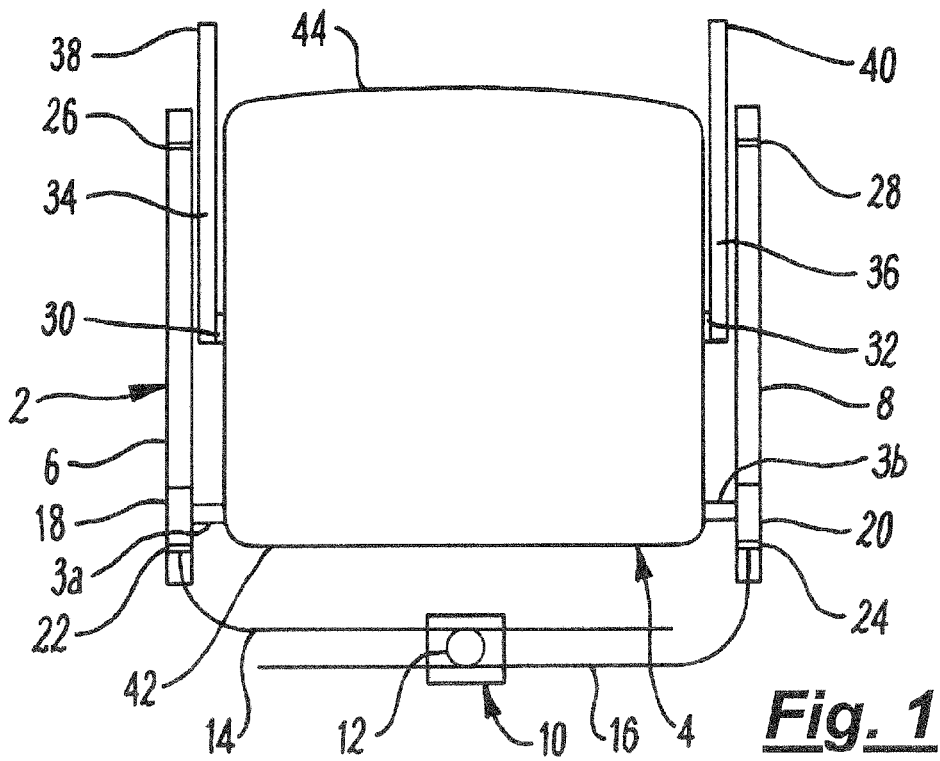
FIG. 1 illustrates a frontal view of a support structure and table of the first and second aspects of the invention, in which the table is in a stowed position.

In an example of a support structure and table of the invention, the support structure comprises a frame (2) comprising left (6) and right (8) hollow rails. Within the hollow rails are located lower stowing end stops (22), (24), and upper deployment end stops (26), (28). A table (4) is connected to the frame (2) by way of pivots (3a), (3b), extending from the table (4) into the hollow rails (6) and (8) adjacent to the stowing end stops (22), (24). The pivots (3a), (3b) are connected to cable trucks (18), (20) which are slidably mounted within the rails (6), (8). Also connected to the frame (2) is an electric drive (10) comprising an electric motor (not shown) coupled to a pinion gear (12) and parallel and opposite racks in the form of cables (14), (16). The cables (14), (16) run in opposite directions, diametrically opposed on the pinion gear (12), and extend into the cable trucks (18), (20) of the hollow rails (6), (8) frame (2). The table (4) includes a rear edge (42) and front edge (44). The primary pivots (3a), (3b) are located adjacent to the rear edge (42), so that rotation of the table (4) about the pivots (3a), (3b) is around the rear edge (42), such that the rear edge stays in substantially the same location during rotation.

Also connected to the table (4) are secondary pivots in the form of pivot points (30), (32) from which extend pivot arms (34), (36), ending in seat pivots (38), (40). The secondary pivots (30), (32) are located on side faces of the seat (4), between the rear (42) and the front (44) edges of the seat.

In use, the support frame (2) is located within a seat (50). In further examples, the support frame (2) is located within a backrest (54) of the seat, which further comprises a base (52) and headrest (56). As shown in FIGS. 3A to 3D, the backrest may include a recess (58) into which the table (4) can be stowed, in order that the table does not protrude from the backrest (54) of the seat (50). The frame (2) of FIGS. 1 and 2 is located within the backrest (54) of the seat (50), such that it does not protrude, nor is visible from the seat (50).

The seat pivots (38), (40) of the pivot arms (34), (36) of the seat (4), are connected to the backrest (54) of the seat (50). The electric drive (10) of the support frame (2) is also located within the backrest of the seat (50).

Figure 2:
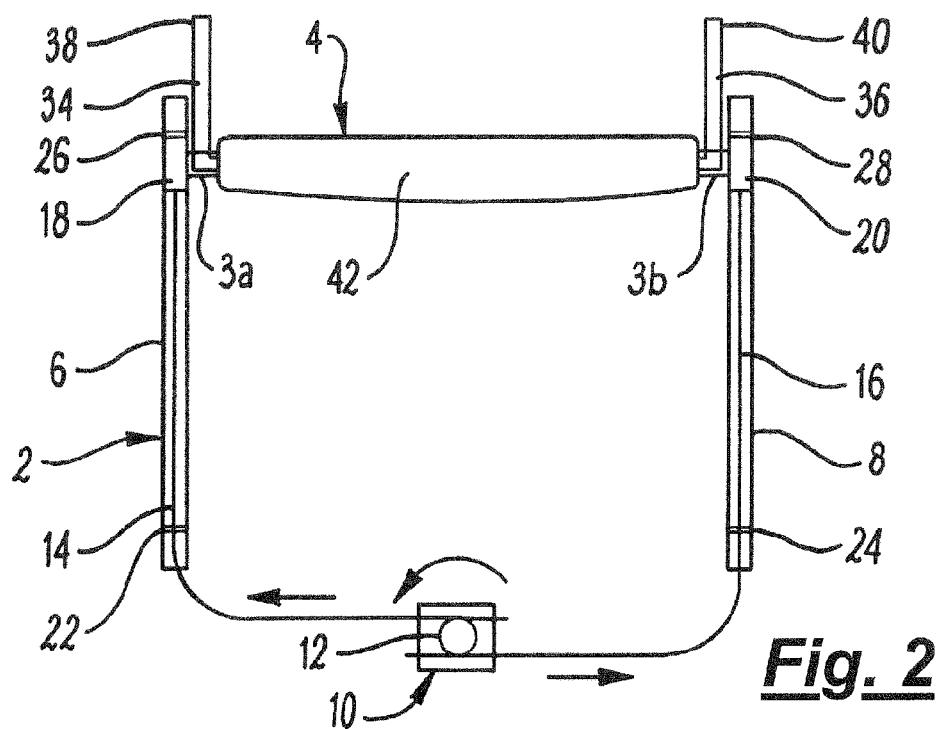
FIG. 2 illustrates a frontal view of the support structure and table of FIG. 1, with the table in a deployed position.
Figure 3A:
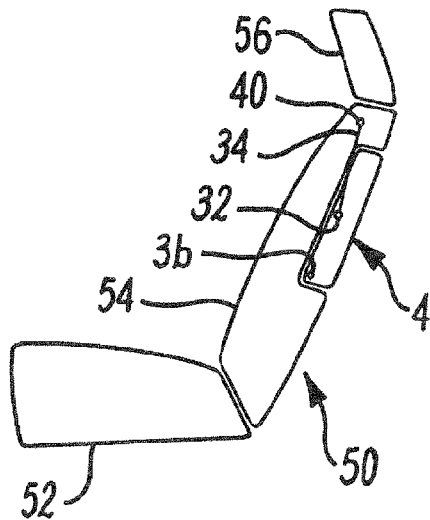
FIG. 3A illustrates a side view of a table connected to a seat of the invention (support structure not shown), wherein the table is in a stowed position.
Figure 3B:
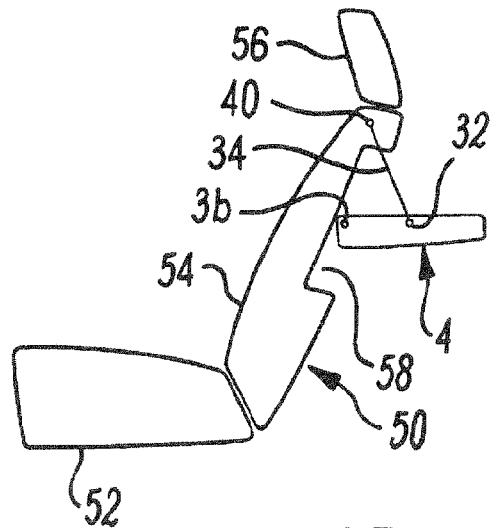
FIG. 3B illustrates the table and seat of FIG. 3a in which the table is in a deployed position.
Figure 3C:
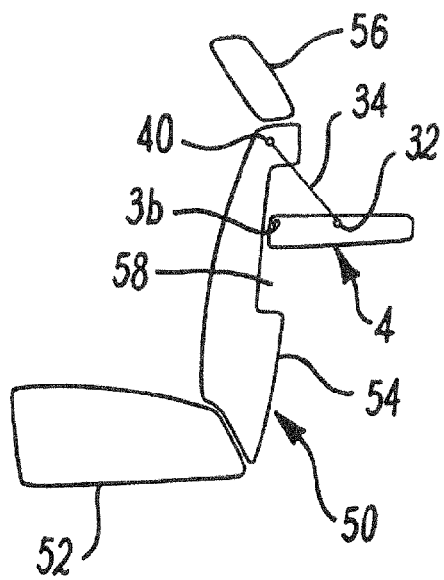
FIG. 3C illustrates the seat and table of FIG. 3a in which the table is in a different deployed position in response to a different seat position.
Figure 3D:
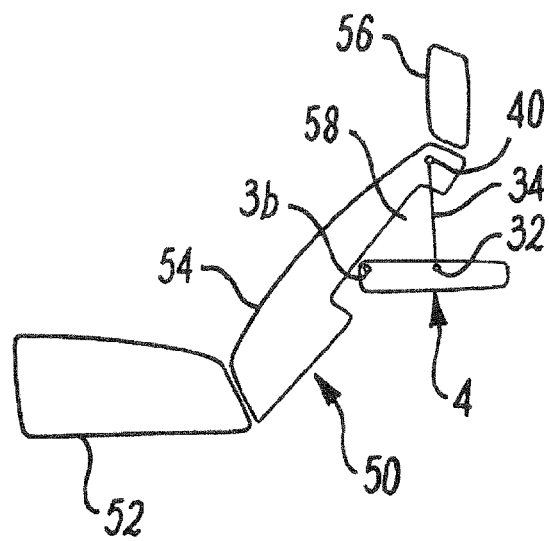
FIG. 3D illustrates the table and seat in a further deployed position.
Figure 4A:
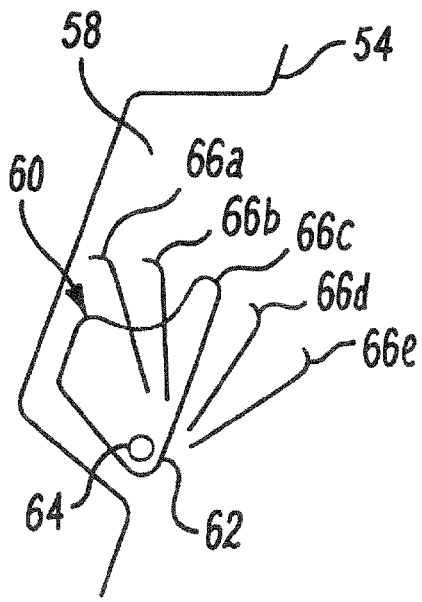
FIG. 4A illustrates a side view of a switch mechanism of an embodiment of the fourth aspect of the invention, in a neutral position.
Figure 4B:
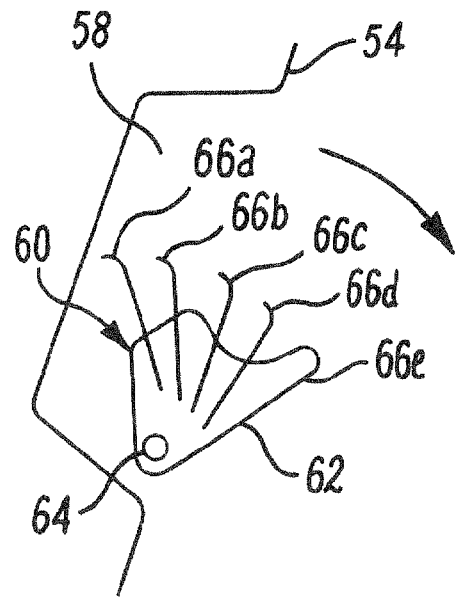
FIG. 4B illustrates the switch mechanism in a deployment memory position.
Figure 4C:
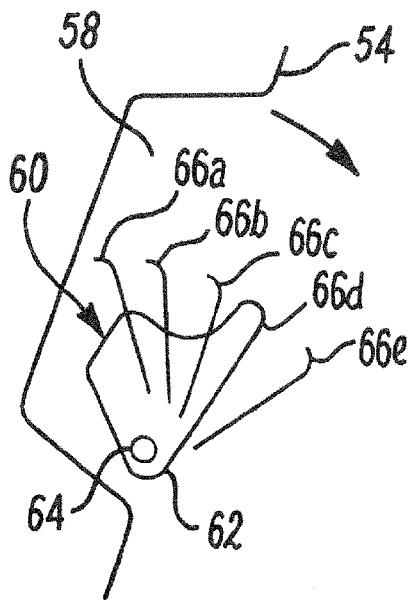
FIG. 4C illustrates the switch mechanism in a deployment adjustment position.
Figure 4D:
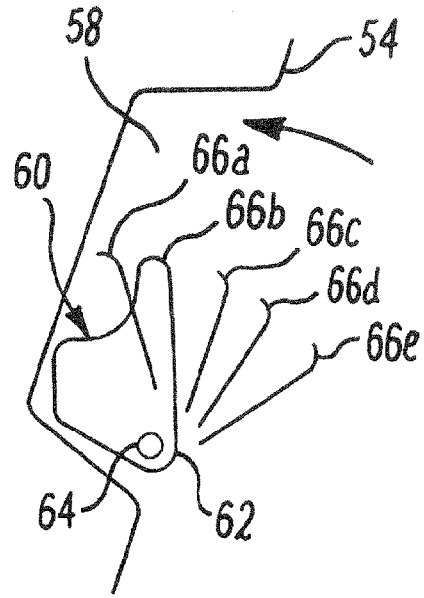
FIG. 4D illustrates the switch in a stowing adjustment position.

In use, a user wishing to deploy the seat (4) from the stowed position as shown if FIGS. 1 and 3A, to a deployed position as shown in FIGS. 2 and 3B-3D may manipulate a switch (60) as shown in FIGS. 4A-4D in order to activate the electric drive (10). At this point, the pinion gear (12) will be rotated by an electric motor, which in turn moves the cables (14), (16), in opposite directions, in order to move the cable trucks (18), (20) of the hollow rails (6), (8) from the lower, stowing end stops (22), (24), towards the deployment end stops (26), (28). As the trucks (18), (20) are moved along the rails (6), (8), the seat (4) is moved upwards, via pivots (3a), (3b) connected to the trucks (18), (20). At the same time, the seat (50) is moved from the stowed to a deployed position, as pivot arms (34), (36) urge the seat (50) in a downward direction. In a new installation of a seat (50) and table (4) in a vehicle, for example, the support (2) and table (4) may be provided with a default deployment memory position, as shown in FIG. 3B, in which it is expected that the seat backrest (54) is in the position shown in FIG. 3B. The position of the table (4) may not be optimal, especially if the seat backrest (54) is moved to a different position, as shown in FIGS. 3C and 3D, in which case the orientation of the table 4 would need to be adjusted to those shown in FIGS. 3C and 3D. As shown in FIGS. 4A-4D, the support frame (2), table (4) or seat (50) is provided with a switch (60) which enables adjustment of the deployment position of the table (4) by a user. The switch (60) is a rocker switch having five positions (66a, 66b, 66c, 66d, 66e) corresponding to the stowing position (66a), a stowing detent (66b), a neutral position (66c), a deployment detent (66d) and a deployment memory position (66e). The switch (60) is manipulated by a user, who can move the switch between all of the positions. In use the switch (60) is urged to the neutral position (66c) shown in FIG. 4A, unless a user manipulates the switch (60). A user may move the switch (60) in one direction, through the deployment detent (66d) to the deployment memory position (66e) as shown in FIG. 4B. A user may also move the switch (60) through the stowing detent (66b) to the stowing position (66a) in the opposite direction. A user may also move the switch (60) to the deployment detent (66d), as shown in FIG. 4C, in order to adjust the deployment position of the table (4) in one direction, and to the stowing detent (60b), to move the table (4) position in the opposite direction as shown in FIG. 4D. The deployment memory position (66e), when activated, effects the default position of the deployment of table (4) as shown in FIG. 3B, and the stowing position (66a) when activated, effects the stowed position of table (4) as shown in FIG. 3A, the table (4) being flush with the recess (58) of the backrest (54) of the seat (50). The detents (66b, 66d) between the stowing position and deployment memory position have respective functions, the deployment detent (66d) enables the user to adjust the position of the seat (4) in a downward direction as shown in FIGS. 3C and 4C, and the stowing detent (66b) enables a user to adjust the position of the seat (4) in an upward direction as shown in FIGS. 3D and 4D respectively. In use, a user may activate either detent (66b, 66d) of the switch (60), which activates the electric drive (10) shown in FIGS. 1 and 2, to rotate the pinion gear (12) and move cables (14), (16) in the required direction, in order to adjust the position of the table (4) within the recess (58) of the backrest (54) of the seat (50). When the required position has been achieved, a user may release the switch (60) which moves back to the neutral position (66c), so that the table (4) remains in the desired position. At this point, suitable electronic means may store the data of the new table deployment position, and seat (50) position, as the new default deployment memory position. A user may then stow the table (4) when required, by moving the switch (60) to the stowing position (66a). When the user next utilises the table (4), moving the switch (60) to the deployment memory position (66e) will automatically move the table (4) to the last known deployment memory position and user may adjust the table (4) again as necessary.

The above embodiments are described by way of example only. Many variations are possible without departing from the scope of the invention.

The invention claimed is:

1. An electrically driven stowable and deployable table mounted on a support structure, wherein the table comprises a single switch operable by a user to select between a first, automatic, operation for stowing and deployment of the table and a second, user adjustable, operation for user adjustment of the deployed position of the table, wherein the single switch includes a deployment memory position in which activation of the single switch activates the first, automatic, operation and an adjustment mode position which activates the second, user adjustable, operation.

2. An electrically driven stowable and deployable table mounted on a support structure as claimed in claim 1 wherein the adjustment mode position controls two separate functions, one which enables a user to adjust the deployment position of the table in one direction and another which enables a user to adjust the deployment position of the table in the opposite direction.

3. An electrically driven stowable and deployable table mounted on a support structure as claimed in claim 1 wherein the deployment memory position includes two functions, one which is activated to deploy the table in a last used deployment position and the other which is activated to move the table to the stowed position.

4. An electrically driven stowable and deployable table mounted on a support structure as claimed in claim 1 wherein the switch comprises a stowing position, a detent corresponding to the adjustment mode position, and a deployment memory position.

5. An electrically driven stowable and deployable table mounted on a support structure as claimed in claim 4 wherein the switch is moved through the detent position into to the deployment memory position in order to deploy the table.

6. An electrically driven stowable and deployable table mounted on a support structure as claimed in claim 4 wherein the switch is moved to the detent position in order for a user to adjust the required deployment position of the table by way of the second, user adjustable operation.

7. An electrically driven stowable and deployable table mounted on a support structure as claimed in claim 4 wherein the detent has two functions, a first function in which the detent position effects movement towards the table stowing position, and a second function in which the detent effects movement towards the deployment memory position.

8. An electrically driven stowable and deployable table mounted on a support structure as claimed in claim 4 wherein the switch can be moved in at least two directions, and the stowing position and deployment memory position of the switch is effected by opposite movement of the switch.

9. An electrically driven stowable and deployable table mounted on a support structure, as claimed in claim 1 wherein the second, user adjustable operation enables rotation of the table up to 15°.

10. An electrically driven stowable and deployable table mounted on a support structure, as claimed in claim 1, wherein the switch further comprises a neutral position, to which the switch is urged in absence of any user input.

11. A seat comprising an electrically driven stowable and deployable table mounted on a support structure as claimed in claim 1.

12. A vehicle comprising a seat as claimed in claim 11.

13. An electrically driven stowable and deployable table mounted on a support structure as claimed in claim 2 wherein the deployment memory position includes two functions, one which is activated to deploy the table in a last used deployment position and the other which is activated to move the table to the stowed position.

14. An electrically driven stowable and deployable table mounted on a support structure as claimed in claim 5 wherein the switch is moved to the detent position in order for a user to adjust the required deployment position of the table by way of the second, user adjustable operation.

15. An electrically driven stowable and deployable table mounted on a vehicle seat backrest, wherein the table comprises a rocker switch having a neutral position, to which the rocker switch is urged in the absence of any user input, and operable by a user in one direction from the neutral position, via a deployment detent, to a deployment memory position and in an opposite direction from the neutral position, via a stowing detent, to a stowing position, wherein:
    operation of the rocker switch to the deployment memory position causes the table to be automatically deployed in a last used position;
    operation of the rocker switch to the stowing position causes the table to be automatically stowed;
    operation of the rocker switch to the deployment detent causes the table to move in one direction; and
    operation of the rocker switch to the stowing detent causes the table to move in the opposite direction.

16. The electrically driven stowable and deployable table as claimed in claim 15 wherein the table is operable to rotate relative to the backrest between deployed and stowed positions.

17. The electrically driven stowable and deployable table as claimed in claim 16 wherein operation of the rocker switch to the deployment or stowing detent enables rotation of the table up to 15° whilst the rocker switch remains in either position.

* * * * *